United States Patent
Lai et al.

(10) Patent No.: US 11,442,201 B2
(45) Date of Patent: Sep. 13, 2022

(54) FLEXIBLE DISPLAY COVER SUBSTRATE

(71) Applicant: Microcosm Technology Co., Ltd., Tainan (TW)

(72) Inventors: Bo-Hung Lai, Tainan (TW); Chih-Te Yen, Tainan (TW); Tang-Chieh Huang, Tainan (TW)

(73) Assignee: Microcosm Technology Co., Ltd., Tainan (TW)

( * ) Notice: Subject to any disclaimer, the term of this patent is extended or adjusted under 35 U.S.C. 154(b) by 447 days.

(21) Appl. No.: 16/619,089

(22) PCT Filed: Apr. 1, 2019

(86) PCT No.: PCT/CN2019/080845
§ 371 (c)(1),
(2) Date: Dec. 4, 2019

(87) PCT Pub. No.: WO2020/199086
PCT Pub. Date: Oct. 8, 2020

(65) Prior Publication Data
US 2021/0165132 A1    Jun. 3, 2021

(51) Int. Cl.
| | |
|---|---|
| *G02B 1/14* | (2015.01) |
| *C08L 79/08* | (2006.01) |
| *B82Y 20/00* | (2011.01) |
| *B82Y 30/00* | (2011.01) |
| *B82Y 40/00* | (2011.01) |
| *C09D 5/22* | (2006.01) |
| *C09D 7/41* | (2018.01) |
| *C08F 292/00* | (2006.01) |
| *H01L 27/32* | (2006.01) |
| *H01L 51/52* | (2006.01) |
| *C08J 7/046* | (2020.01) |
| *G09F 9/30* | (2006.01) |

(52) U.S. Cl.
CPC ............... *G02B 1/14* (2015.01); *C08J 7/046* (2020.01); *C08L 79/08* (2013.01); *C09D 5/22* (2013.01); *C09D 7/41* (2018.01); *G09F 9/301* (2013.01); *B82Y 20/00* (2013.01); *B82Y 30/00* (2013.01); *B82Y 40/00* (2013.01); *C08J 2379/08* (2013.01); *C08L 2201/10* (2013.01); *G02B 2207/101* (2013.01); *G02B 2207/113* (2013.01)

(58) Field of Classification Search
None
See application file for complete search history.

(56) References Cited

U.S. PATENT DOCUMENTS

| | | | |
|---|---|---|---|
| 8,582,207 B2 | 11/2013 | Fukuda et al. | |
| 2016/0320803 A1* | 11/2016 | Oh | B32B 3/085 |
| 2018/0264790 A1 | 9/2018 | Leatherdale et al. | |
| 2018/0265731 A1* | 9/2018 | Ekinaka | C23C 28/00 |

FOREIGN PATENT DOCUMENTS

| | | |
|---|---|---|
| CN | 105121159 | 12/2015 |
| CN | 106206945 | 12/2016 |
| CN | 106409150 | 2/2017 |
| CN | 206379378 | 8/2017 |
| CN | 107820503 | 3/2018 |
| CN | 107850712 | 3/2018 |
| CN | 109273501 | 1/2019 |
| TW | 200827386 | 7/2008 |
| TW | I403808 | 8/2013 |
| WO | 2016022035 | 2/2016 |

OTHER PUBLICATIONS

Office Action of China Counterpart Application, dated Apr. 2, 2021, pp. 1-6.
"Office Action of Taiwan Counterpart Application", dated Jun. 22, 2020, p. 1-p. 6.
"International Search Report (Form PCT/ISA/210) of PCT/CN2019/080845," dated Jan. 9, 2020, pp. 1-4.
"Written Opinion of the International Searching Authority (Form PCT/ISA/237) of PCT/CN2019/080845," dated Jan. 9, 2020, pp. 1-3.

* cited by examiner

*Primary Examiner* — Sheeba Ahmed
(74) *Attorney, Agent, or Firm* — JCIPRNET

(57) ABSTRACT

A flexible display cover substrate is provided, including a transparent polyimide film and a device protective layer. The device protective layer is formed by a hard coating layer disposed on at least one side of the transparent polyimide film, and the hard coating layer is composed of three or more reactive functional group compounds, an initiator, an elastic oligomer, a nano inorganic modified particle, and a fluorescent pigment. The flexible display cover substrate of the invention, after being folded by a radius of curvature of 1 mm, does not cause cracks on the surface of the hard coating layer or break the substrate, and the yellow index YI of the flexible display cover substrate is less than 2.0.

10 Claims, 2 Drawing Sheets

FLEXIBLE DISPLAY COVER SUBSTRATE

CROSS-REFERENCE TO RELATED APPLICATION

This application is a 371 application of the international PCT application serial no. PCT/CN2019/080845, filed on Apr. 1, 2019. The entirety of the above-mentioned patent application is hereby incorporated by reference herein and made a part of this specification.

BACKGROUND OF THE INVENTION

Field of the Invention

The invention relates to a flexible display cover substrate, and more particularly to a flexible display cover substrate having excellent bending performance.

Description of Related Art

In recent years, the development of displays has gradually evolved from being thin and light to flexible displays that are bendable and deformable. In this development process, the cover substrate used in the flexible display has deviated from a non-conventional glass substrate, and instead a flexible substrate made of a bendable flexible material such as plastic (i.e., a flexible material) has been adopted. However, the flexible display readily causes abrasion and scratches on the cover substrate during the deformation process, thereby causing hazing or damage to the display region. In order to solve this issue, a layer of acrylic-based or epoxy-based organic hardened film is generally applied as a protective layer on the surface of the plastic material to improve the hardness of the material, but the organic hardened film is not flexible and has the issue of surface cracking in bending or impact resistance tests.

In addition to scratch and abrasion resistance, optical color shift is also an issue that needs to be overcome for the cover substrate. At present, existing optical-grade plastic substrates include polyethylene terephthalate (PET) products, but the glass transition temperature thereof is less than 200° C., so that the operating temperature is limited, and because of the crystalline polymer, hazing and elastic fatigue occur after prolonged folding, such that light emission of the display region is affected.

Polyimide has advantages such as high-temperature resistance, good chemical resistance, and high mechanical strength. After molecular and structural design, intermolecular and intramolecular charge transfer phenomenon may be reduced to obtain a transparent colorless polyimide film. After prolonged folding, hazing phenomenon does not occur and the polyimide may be used for optical substrate applications such as flexible displays. However, when the thickness of the transparent polyimide film is greater than 50 µm, the yellow index (YI) thereof is also increased, thus affecting the appearance of the display.

In order to solve the yellow index YI increase caused by the thickness increase of the polyimide-coated substrate, in the prior art, the addition of a blue pigment such as phthalocyanine, dangdanone, indophenol, and anthraquinone to the polyimide or the hard coating layer was respectively proposed to reduce the yellow index YI via the principle of color complementation. However, the blue pigment generally has an absorption wavelength of 550 nm to 600 nm, which affects the optical transmittance of the cover substrate, and the addition causes the cover substrate to produce a light blue color under visible light which affects the appearance of the product.

Based on the above, a flexible display cover substrate has been developed which has excellent bending performance and may reduce the yellow index YI, which is an important subject for current research.

SUMMARY OF THE INVENTION

The invention provides a flexible display cover substrate, which may simultaneously suppress an increase in the thickness of the transparent polyimide substrate and the resulting increase in yellow index YI without affecting the total light transmittance, and has excellent bending performance.

The invention provides a flexible display cover substrate that includes a transparent polyimide film and a device protective layer. The device protective layer is formed by a hard coating layer disposed on at least one side of the transparent polyimide film, and the hard coating layer is composed of three or more reactive functional group compounds, an initiator, an elastic oligomer, a nano inorganic modified particle, and a fluorescent pigment.

In an embodiment of the invention, a yellow index YI of the flexible display cover substrate is less than 2.0.

In an embodiment of the invention, the fluorescent pigment is composed of a photoluminescent material and has an absorption wavelength of 360 nm to 430 nm and an emission wavelength of 430 nm to 520 nm.

In an embodiment of the invention, a Stokes shift of the fluorescent pigment is less than 150 nm.

In an embodiment of the invention, the fluorescent pigment is an organic fluorescent pigment such as Coumarin series, Fluorol 7GA (2-butyl-6-(butylamino)-1H-benz[de]isoquinoline-1,3(2H)-dione), pyridine 1 (1-ethyl-2-(4-(p-dimethylaminophenyl)-1,3-butadienyl)-pyridinium perchlorat), carbazole, or an inorganic fluorescent pigment such as a fluorescent powder or a quantum dot.

In an embodiment of the invention, based on a total weight of the hard coating layer, an amount of the fluorescent pigment is 0.01 wt % to 1 wt %.

In an embodiment of the invention, a thickness of the flexible display cover substrate is 50 µm to 130 µm and a total light transmittance thereof is 90% or more.

In an embodiment of the invention, a thickness of the hard coating layer is 5 µm to 30 µm and a hardness thereof is 7H to 9H.

In an embodiment of the invention, a thickness of the transparent polyimide film is 25 µm to 100 µm.

In an embodiment of the invention, based on a total weight of the hard coating layer, amounts of the three or more reactive functional group compounds and the initiator are 10 wt % to 60 wt %.

Based on the above, the flexible display cover substrate of the invention has a thinned hard coating layer, and therefore has excellent performance in flexibility, and the hard coating layer is still not cracked after being bent 100,000 times through a radius of curvature of 1 mm. At the same time, the introduction of the fluorescent pigment may adjust the yellow index of the flexible display cover substrate without affecting the visual color of the screen.

In order to make the aforementioned features and advantages of the invention more comprehensible, embodiments are described in detail below.

BRIEF DESCRIPTION OF THE DRAWINGS

The accompanying drawings are included to provide a further understanding of the invention, and are incorporated

DESCRIPTION OF THE EMBODIMENTS

Figure 1:
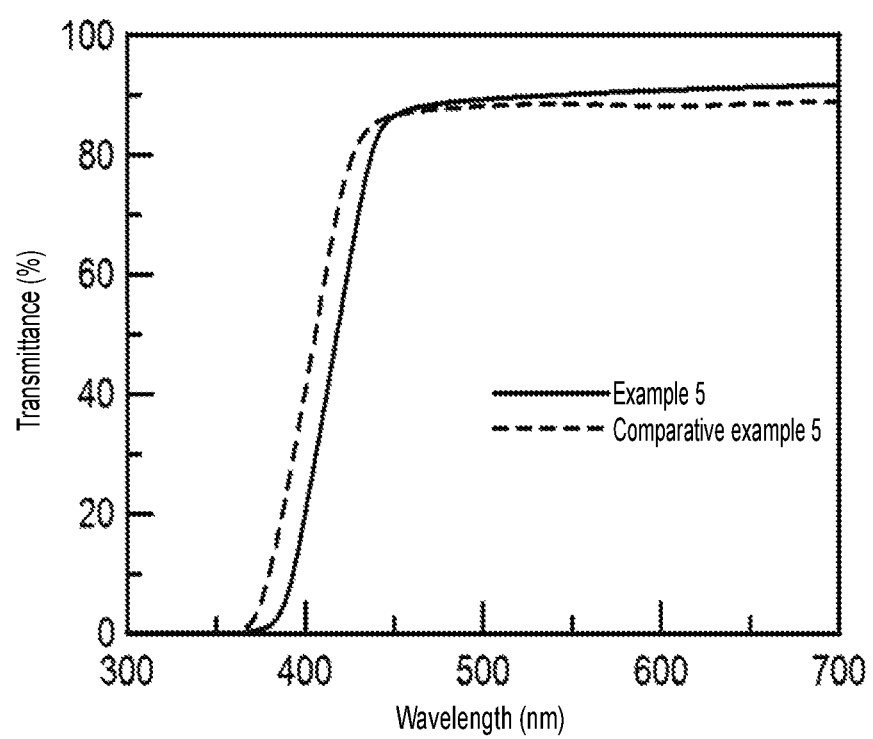
FIG. 1 is a schematic diagram showing the transmittance and wavelength of Example 5 and Comparative example 5.

In the present specification, a range represented by "a numerical value to another numerical value" is a schematic representation for avoiding listing all of the numerical values in the range in the specification. Therefore, the recitation of a specific numerical range covers any numerical value in the numerical range and a smaller numerical range defined by any numerical value in the numerical range, as is the case with the any numerical value and the smaller numerical range stated explicitly in the specification. In the following, embodiments are provided as examples of actual implementation of the invention. However, the embodiments are exemplary, and the invention is not limited thereto.

<Flexible Display Cover Substrate>

The invention provides a flexible display cover substrate that includes a transparent polyimide film and a device protective layer. The device protective layer is formed by a hard coating layer disposed on at least one side of the transparent polyimide film, and the hard coating layer is composed of three or more reactive functional group compounds, an initiator, an elastic oligomer, a nano inorganic modified particle, and a fluorescent pigment, and the surface of the hard coating layer has a hydrophobicity with a water drop angle of >105 Å. The flexible display cover substrate of the invention, after being folded by a radius of curvature of, for example, 1 mm, does not cause cracks on the surface of the hard coating layer or break the substrate, and the yellow index YI of the flexible display cover substrate is less than 2.0.

<Transparent Polyimide Film>

The polyimide of the invention may be composed of a unit represented by the following chemical formula (1):

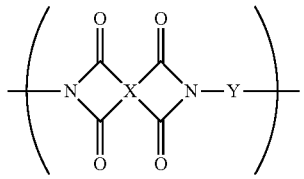

chemical formula (1)

In the above chemical formula (1), X represents a dianhydride, which may include, but is not limited to: a mixture of two or more of 2,2'-bis-(3,4-dicarboxyphenyl)hexafluoropropane dianhydride (6FDA), 4,4'-diphenylether tetracarboxylic anhydride (ODPA), biphenyltetracarboxylic dianhydride (BPDA), benzophenone tetracarboxylic dianhydride (BTDA), cyclobutane tetracarboxylic dianhydride (CBDA), cyclopentane tetracarboxylic dianhydride (CPDA), 3,3',4,4'-diphenylsulfonetetracarboxylic anhydride (DSDA), 4,4'-(4,4'-isopropyldiphenoxy)bis(phthalic anhydride) (BPADA), 2,2-bis[4-(3,4-dicarboxyphenoxy)phenyl]hexafluoroisopropane dianhydride (HFBPADA), ethylene glycol bis(trimellitic anhydride) (TMEG), propylene glycol bis(trimellitic anhydride) (TMPG), bicyclo[2.2.1]heptane-2,3,5,6-tetracarboxylic dianhydride (BHDA), bicyclo[2.2.2]oct-7-ene-2,3,5,6-tetracarboxylic dianhydride (BOTDA), and bicyclo[2.2.2]octane-2,3,5,6-tetracarboxylic dianhydride (BODA), etc.

In the above chemical formula (1), Y represents a diamine which may include, but is not limited to: a mixture of two or more of bis[4-(4-aminophenoxy)phenyl]sulfone (BAPS), 2,2'-bis[4-(4-aminophenoxy)phenyl]propane (BAPP), 2,2-bis[4-(4-aminophenoxy)phenyl]-1,1,1,3,3,3-hexafluoropropane (APHF), 2,2'-bis(trifluoromethyl)benzidine (TFMB), 4,4'-diaminodiphenyl ether (ODA), diaminodiphenyl sulfone (3DDS, 4DDS), 2,2-bis(4-aminophenyl)hexafluoropropane (BISAF), cyclohexanediamine (CHDA), 1,3-bis(3-aminophenoxy)benzene (TPE-M), 1,3-bis(4-aminophenoxy)benzene (TPE-R), 1,4-bis(3-aminophenoxy)benzene, and 1,4-bis(4-aminophenoxy)benzene (TPE-Q), and the like.

The polymerization method may include dissolving the dianhydride monomer and the diamine monomer using a solvent, and then mixing and reacting the dissolved dianhydride monomer and diamine monomer to obtain a polyamide acid resin (polyimide resin precursor). The solvent may be, for example, an aprotic solvent such as N,N-dimethylacetamide, N,N-diethylacetamide, N,N-dimethylformamide, or N-methyl-2-pyrrolidone. However, the invention is not limited thereto, and other suitable aprotic solvents may also be used.

The method of imidization may be performed using high-temperature aging, for example, continuous or segmental heating of a polyamic acid resin (polyimide resin precursor). When the polyimide resin is formed into a film or an insulating layer, the polyamide resin (polyimide resin precursor) may be coated on a substrate first, and then the entire substrate is heated in an oven for aging. A chemical closed-loop method in which an unrestricted alkaline reagent pyridine, triethylamine, or N,N-diisopropylethylamine or the like and a dehydrating reagent acetic anhydride are added to the polyamide under nitrogen or oxygen may be adopted. After the reaction is completed, the colloid is filtered by water to obtain a polyimide powder, and the powder is dissolved in a solvent; in addition, a closed-loop method using a heating method may be used to add polyamide acid to an azeotropic reagent which is not limited to toluene or xylene, and the temperature is raised to 180° C. and the water and azeotropic reagent produced by the polyamide acid close-loop are removed. After the reaction is completed, a polyimide solution is obtained.

In the present embodiment, the thickness of the transparent polyimide film is, for example, 25 μm to 100 μm, and the total light transmittance is 90% or more. One or two or more kinds of UV absorbing agents may also be added to the polyimine film of the invention. The UV absorbing agent may be selected from general plastic materials often used as UV absorbing agents, or may be light compounds or inorganic nanomaterials having an absorption wavelength of 400 nm or less. The UV absorbing agent may be exemplified by a benzophenone compound, a salicylate compound, a benzotriazole compound, and a triazine compound, and at least one compound is selected. Via the addition of the UV absorbing agent, yellowing and deterioration of the material of the polyimide resin due to UV irradiation may be suppressed.

<Device Protective Layer>

The device protective layer of the invention is formed by a hard coating layer disposed on at least one side of the transparent polyimide film. More specifically, the hard coating layer of the invention is coated on at least one side of the transparent polyimide film and cured by ultraviolet or heat. The hard coating layer may be produced by a known coating method, including slit coating, spin coating, or inkjet printing, but is not limited thereto. In the invention, the hard coating layer is composed of three or more reactive functional group compounds, an initiator, an elastic oligomer, a nano inorganic modified particle, and a fluorescent pigment. The amounts of the three or more reactive functional group compounds and the initiator are, for example, 10 wt % to 60 wt % based on the total weight of the hard coating layer. The amount of the fluorescent pigment is, for example, 0.01 wt % to 1 wt % based on the total weight of the hard coating layer.

The UV curing includes, for example, irradiating the composition with UV having a wavelength of 312 nm to 365 nm and an energy of 500 mJ/cm$^2$ to 10,000 mJ/cm$^2$ to cure the components in the composition via a crosslinking reaction. The composition is baked at 150° C. to 200° C. by heating and curing, such that the components in the composition are cured via a crosslinking reaction. In the invention, the hard coating layer has an excellent pencil hardness of, for example, 7H to 9H at a thickness of, for example, 5 μm to 30 μm, and may be folded 100,000 times by a folding radius of 1 mm.

<3 or More Reactive Functional Group Compounds>

Examples of the three or more reactive functional group compounds include, but are not limited to, dipentaerythritolhexaacrylate, pentaerythritoltriacrylate, dipentaerythritoltriacrylate, dipentaerythritolacrylate, pentaerythritolhexaacrylate, trimethylolpropane triacrylate, trimethylallyl isocyanurate, triallyl isocyanurate, tetramethyltetravinyl cyclotetrasiloxane, trimethylolpropane ethoxy triacrylate (TMPEOTA), glycerine propoxylated triacrylate (GPTA), pentaerythritol tetraacrylate (PETA), pentaerythritol tri (meth)acrylate, pentaerythritol tetra(meth)acrylate, dipentaerythritol penta(meth)acrylate, pentaerythritol tri(meth)acrylate, dipentaerythritol penta(meth)acrylate, tripentaerythritol hepta(meth)acrylate. Three or more reactive functional group compounds may be used independently or in combination of two or more, depending on need.

<Initiator>

The initiator may be a photoinitiator or a thermal initiator, and may be used independently or in combination of two or more. The amounts of the three or more reactive functional group compounds and the initiator are not particularly limited, and generally, the composition ratio of the three or more reactive functional groups to the initiator is 5:1 to 100:1, and based on the total weight of the hard coating layer material, the amounts of the three or more reactive functional group compounds and the initiator are, for example, 10 wt % to 60 wt %. If the amount of the initiator is the lower limit or more, the degree of polymerization is maintained to a certain extent, and the polymer formed by the monomer retains polymer properties. If the amount of the initiator is less than or equal to the upper limit, the polymer formed by the monomer does not have the issue of being brittle due to the degree of polymerization being too high. If the amount of the monomer having an unsaturated bond is too low, the degree of crosslinking of the polymer is insufficient for curing. If the proportion of the monomer having an unsaturated bond is too high, the polymer is brittle.

Photoinitiators suitable for use in the invention include, but are not limited to, acetophenone such as 2-methyl-1-(4-(methylthio)phenyl)-2-morpholino-propane, 1-hydroxycyclohexyl phenyl ketone, diethoxyacetophenone, 2-hydroxy-2-methyl-1-phenylpropane-1-one, 2-benzyl-2-(dimethylamino)-1-[4-(morpholinyephenyl]-1-butanone, or other suitable acetophenones; benzoin such as benzoin, benzoin methyl ether, benzyl dimethyl ketal, or other suitable benzoins; benzophenone such as benzophenone, 4-phenyl benzophenone, hydroxyl benzophenone, or other suitable benzophenones; thioxanthone such as isopropyl thioxanthone, 2-chlorothioxanthone, or other suitable thioxanthones; anthraquinone such as 2-ethylanthraquinone or other suitable anthraquinones. The photoinitiators may be used independently or in combination of two or more depending on the needs of the user. For example, to obtain a faster photospeed, isopropyl thioxanthone and 2-benzyl-2-(dimethylamino)-1-[4-(morpholinyephenyl]-1-butanone may be mixed and used as a photo initiator.

Thermal initiators suitable for use in the invention include, but are not limited to: azo such as 2,2'-azobis(2,4-dimethyl valeronitrile), dimethyl 2,2'-azobis (2-methylpropionate), 2,2-azobisiso butyronitrile (AIBN), 2,2-azobis(2-methylisobutyronitrile), 1,1'-azobis(cyclohexane-1-carbonitrile), 2,2'-azobis[N-(2-propenyl)-2-methyl propionamide], 1-[(cyano-1-methylethyl)azo]formamide, 2,2'-azobis(N-butyl-2-methylpropionamide), 2,2'-azobis (N-cyclohexyl-2-methylpropionamide, or other suitable azo initiators; peroxide such as benzoyl peroxide, 1,1-bis(tert-butylperoxy)cyclohexane, 2,5-bis(tert-butylperoxy)-2,5-dimethylcyclohexane, 2,5-bis(tert-butylperoxy)-2,5-dimethyl-3-cyclohexyne, bis(1-(tert-butylpeorxy)-1-methyethyl) benzene, tert-butyl hydroperoxide, tert-butyl peroxide, tert-butyl peroxybenzoate, cumene hydroperoxide, cyclohexanone peroxide, dicumyl peroxide, lauroyl peroxide, or other suitable peroxides. The thermal initiators may be used independently or in combination of two or more depending on need.

<Elastic Oligomer>

The elastic oligomer may be an oligomer of carbamate (meth)acrylic acid, and may be formed by reacting hydroxy (meth)acrylate and diisocyanate. In particular, the hydroxy (meth)acrylate may be synthesized from (meth)acrylate or propylene and polyol, and the (meth)acrylate may be methyl (meth)acrylate, ethyl (meth)acrylate, isopropyl (meth)acrylate, butyl (meth)acrylate, or cyclohexyl (meth)acrylate. The polyol may be ethylene glycol, 1,3-propylene glycol, diethylene glycol, neopentyl glycol, 1,4-butanediol, 1,6-hexanediol, 1,5-pentanediol, trimethylolpropane, glycerin, 1,3,5-triol, pentaerythritol, dipentaerythritol, and the like. The diisocyanate may be hexamethylene diisocyanate, 2,4-toluene diisocyanate, xylene diisocyanate, trimethylhexaylene diisocyanate, 4-diphenylmethane diisocyanate, 1,5-naphthalene diisocyanate, etc. Commercially available products of carbamate(meth)acrylic acid oligomer such as U-2PPA, U10-HA, U10-PA, UA-1100H, UA-15HA, UA-33H, U-200PA, UA-290TM, UA-160TM, UA-122P, etc. produced by Shin-Nakamura Chemical Co., Ltd. or U022-081, U026-001, U022-162, U052-002, U026-012, U022-312, etc. produced by Sun Prosper Chemicals may also be used. The added elastic oligomer has a molecular weight of 500 g/mol to 5000 g/mol, and based on the total weight of the hard coating layer material, the amount thereof is, for example, 0.1 wt % to 10 wt %.

<Nano Inorganic Modified Particle>

The nano inorganic modified particle may be obtained by reacting a reaction component containing unmodified nano inorganic particles and a modifier. In the reaction component, the amount of the nano inorganic particles is preferably from 90 wt % to 98 wt %, and the amount of the modifier is preferably 2 wt % to 10 wt %. Nano inorganic particles suitable for use in the invention include, but are not limited to, nano inorganic metal oxide particles such as titanium dioxide, silicon dioxide, zirconium oxide, zinc oxide, and aluminum oxide. The modifier suitable for use in the invention may be a silane coupling agent which is an organic silicon compound containing chlorosilane, alkoxysilane, or silazane. The functional group contained in the silane coupling agent may contain a vinyl group, a methacryloxy group, an acryloxy group, an amine group, a urea group, a chloropropyl group, a thiol group, a polysulfide or an isocyanate, but is not limited thereto. Examples of the silane coupling agent may contain, but are not limited to, vinyl trichlorosilane, vinyl trimethoxy silane, vinyl triethoxy silane, 3-methacryloxypropyl-methyldimethoxysilane, 3-methacryloxypropyl-trimethoxysilane, 3-methacryloxypropyl-methyldiethoxysilane, 3-methacryloxypropyl-triethoxysilane, 3-acryloxypropyl trimethoxy silane, N-2-aminoethyl-3-aminopropylmethyldimethoxysilane, N-2-aminoethyl-3-aminopropyltrimethoxysilane, N-2-aminoethyl-3-aminopropyltriethoxysilane, 3-aminopropyltrimethoxysilane, 3-aminopropyltriethoxysilane, N-phenyl-3-aminopropyltrimethoxysilane, 3-chloropropyltriethoxysilane, 3-mereaptopropyltrimethoxysilane, bis(triethoxymethanepropanepropyl)tetrasulfide, 3-isocyanatepropyltriethoxysilane.

The manner of mixing the nano inorganic modified particle and the mixture of the monomer having an unsaturated bond and the initiator is not particularly limited, and they may generally be uniformly mixed by ball milling, screw, planetary mixing, or stirring. Based on the total weight of the hard coating layer material, the amount of the modified nano inorganic particle is, for example, 40 wt % to 80 wt %.

<Fluorescent Pigment>

The fluorescent pigment is composed of a photoluminescent material and has an absorption wavelength of 360 nm to 430 nm and an emission wavelength of 430 nm to 520 nm. The Stokes shift of the fluorescent pigment is less than 150 nm, and the Stokes shift is the difference between the strongest wavelengths of the absorption and emission spectra of the same electronic transition. The fluorescent pigment is an organic fluorescent pigment such as Coumarin series such as Coumarin 1, Coumarin 2, Coumarin 4, Coumarin 7, Coumarin 30, Coumarin 47, Coumarin 102, Coumarin 151, Coumarin 152, Coumarin 152A, Coumarin 153, Coumarin 307, Coumarin 314, Coumarin 500, Coumarin 510, Coumarin 522, Coumarin 6H, etc. or other organic fluorescent pigments such as Fluorol 7GA (2-butyl-6-(butylamino)-1H-benz[de]isoquinoline-1,3(2H)-dione), pyridine 1(1-ethyl-2-(4-(p-dimethylaminophenyl)-1,3-butadienyl)-pyridinium perchlorat), carbazole, and the like. The fluorescent pigment may also be an inorganic fluorescent pigment such as a fluorescent powder or a quantum dot having a particle size less than 100 nm. The amount of the fluorescent pigment is, for example, 0.01 wt % to 1 wt % based on the total weight of the hard coating layer. The fluorescent pigment may be dissolved or dispersed in an organic solvent, and the organic solvent may be a solvent such as ethyl acetate, n-butyl acetate, γ-butyrolactone, ethanol, isopropanol, propylene glycol, acetone, methyl ethyl ketone, or cyclopentanone.

In the following, the polyimide film of the embodiments is described in detail via experimental examples. However, the following experimental examples are not intended to limit the invention.

EXPERIMENTAL EXAMPLES

In order to prove that the flexible display cover substrate of the invention has good performance, the following experimental examples are specifically made.

Preparation Example

Compositions for preparing a hard coating layer may all be heat cured or photocured to form a coating having high hardness. The modified nano inorganic particle in the hard coating layer was obtained by mixing 1 part by weight of a nano silicon dioxide particle solution and 0.01 parts by weight of 3-methacryloxypropyl-trimethoxy silane, and the mixture was reacted by heating at 50° C. for 4 hours under nitrogen to perform modification synthesis. After the reaction was completed, the mixture was cooled to room temperature, and 1 part by weight of the modified nanoparticle solution was added to 0.133 parts by weight of pentaerythritol hexaacrylate and 0.133 parts by weight of the elastic oligomer UA160-TM and stirred for 30 minutes, and then solution phase inversion was performed according to the solvent required. Lastly, a solution formed by mixing 1.5 parts by weight of the modified nano inorganic particle and a monomer having an unsaturated bond, 0.03 parts by weight of 2-methyl-1-(4-(methylthiol)phenyl-2-morpholino-propane, and 0.01 parts by weight of a leveling agent were mixed, and the final solid content was adjusted to 55% with an ethyl acetate solvent. A composition of the subsequent examples and comparative examples was obtained by adding a suitable concentration of the fluorescent pigment.

Example 1

20 g of the hard coating layer composition was added with 0.11 g of Coumarin 1 (1% dissolved in ethyl acetate), and after stirring and mixing for 30 minutes, the mixture was spin-coated at 250 rpm for 10 seconds on the surface of a transparent polyimide (CPI) substrate and soft-baked at 80° C. for 5 minutes, then exposed at 500 mJ/cm$^2$, and lastly hard-baked at 180° C. for 30 minutes.

Example 2

20 g of the hard coating layer composition was added with 3 g of Coumarin 1 (1% dissolved in ethyl acetate), and after stirring and mixing for 30 minutes, the mixture was spin-coated at 250 rpm for 10 seconds on the surface of a transparent polyimide (CPI) substrate and soft-baked at 80° C. for 5 minutes, then exposed at 500 mJ/cm$^2$, and lastly hard-baked at 180° C. for 30 minutes.

Example 3

20 g of the hard coating layer composition was added with 1.1 g of Coumarin 1 (5% dissolved in ethyl acetate), and after stirring and mixing for 30 minutes, the mixture was spin-coated at 250 rpm for 10 seconds on the surface of a transparent polyimide (CPI) substrate and soft-baked at 80° C. for 5 minutes, then exposed at 500 mJ/cm$^2$, and lastly hard-baked at 180° C. for 30 minutes.

Example 4

20 g of the hard coating layer composition was added with 2.2 g of Coumarin 1 (5% dissolved in ethyl acetate), and after stirring and mixing for 30 minutes, the mixture was spin-coated at 250 rpm for 10 seconds on the surface of a transparent polyimide (CPI) substrate and soft-baked at 80° C. for 5 minutes, then exposed at 500 mJ/cm$^2$, and lastly hard-baked at 180° C. for 30 minutes.

Example 5

20 g of the hard coating layer composition was added with 3 g of Coumarin 7 (1% dissolved in ethyl acetate), and after stirring and mixing for 30 minutes, the mixture was spin-coated at 250 rpm for 10 seconds on the surface of a transparent polyimide (CPI) substrate and soft-baked at 80° C. for 5 minutes, then exposed at 500 mJ/cm$^2$, and lastly hard-baked at 180° C. for 30 minutes.

Example 6

20 g of the hard coating layer composition was added with 3 g of Fluorol 7GA (1% dissolved in ethyl acetate), and after stirring and mixing for 30 minutes, the mixture was spin-coated at 250 rpm for 10 seconds on the surface of a transparent polyimide (CPI) substrate and soft-baked at 80° C. for 5 minutes, then exposed at 500 mJ/cm$^2$, and lastly hard-baked at 180° C. for 30 minutes.

Comparative Example 1

20 g of the hard coating layer composition was spin-coated at 250 rpm for 10 seconds on the surface of a transparent polyimide (CPI) substrate, soft-baked at 80° C. for 5 minutes, exposed at 500 mJ/cm$^2$, and lastly hard-baked at 180° C. 30 minutes.

Comparative Example 2

20 g of the hard coating layer composition was added with 0.09 g of Coumarin 1 (1% dissolved in ethyl acetate), and after stirring and mixing for 30 minutes, the mixture was spin-coated at 250 rpm for 10 seconds on the surface of a transparent polyimide (CPI) substrate and soft-baked at 80° C. for 5 minutes, then exposed at 500 mJ/cm$^2$, and lastly hard-baked at 180° C. for 30 minutes.

Comparative Example 3

20 g of the hard coating layer composition was added with 2.4 g of Coumarin 1 (5% dissolved in ethyl acetate), and after stirring and mixing for 30 minutes, the mixture was spin-coated at 250 rpm for 10 seconds on the surface of a transparent polyimide (CPI) substrate and soft-baked at 80° C. for 5 minutes, then exposed at 500 mJ/cm$^2$, and lastly hard-baked at 180° C. for 30 minutes.

Comparative Example 4

20 g of the hard coating layer composition was added with 1 g of CuPc (copper (II) phthalocyanine, 0.25% mixed with n-butyl acetate), and after 30 minutes of stirring and mixing, the mixture was spin-coated at 250 rpm for 10 seconds on the surface of a transparent polyimide (CPI) substrate, soft-baked at 80° C. for 5 minutes, then exposed at 500 mJ/cm$^2$, and lastly hard-baked at 180° C. for 30 minutes.

Comparative Example 5

20 g of the hard coating layer composition was added with 1.5 g of CuPc (2% mixed in n-butyl acetate), and after stirring and mixing for 30 minutes, the mixture was spin-coated at 250 rpm for 10 seconds on the surface of a transparent polyimide (CPI) substrate and soft-baked at 80° C. for 5 minutes, then exposed at 500 mJ/cm$^2$, and lastly hard-baked at 180° C. for 30 minutes.

Comparative Example 6

50 g of the hard coating layer composition was added with 1 g of Pigment Blue 60 (0.25% mixed in n-butyl acetate), and after stirring and mixing for 30 minutes, the mixture was spin-coated at 250 rpm for 10 seconds on the surface of a transparent polyimide (CPI) substrate and soft-baked at 80° C. for 5 minutes, then exposed at 500 mJ/cm$^2$, and lastly hard-baked at 180° C. for 30 minutes.

Performance Evaluation

Thickness Measurement

The thickness of each plastic substrate was measured via thickness gauge contact, and the thickness of the hard coating layer on the plastic substrate was measured by Alpha Step.

Measurement of Pencil Hardness

Using an electronic pencil hardness tester, a 10 mm long line was drawn five times on each of the cover substrates with a Mitsubishi test pencil at a speed of 30 mm/min under a load of 750 g, and the surface scratch was compared with the pencil hardness.

Total Light Transmittance (%) and Haze

The total light transmittance and haze of the cover substrate were measured using Nippon Denshoku DOH 5500 according to ASTM D1007.

Yellow Index YI Measurement

The yellow index YI value of the cover substrate was measured using Nippon Denshoku DOH 5500 according to ASTM E313.

The yellow index YI is a tristimulus value (x, y, z) measured by a spectrophotometer for transmittance measurement of light of 400 to 700 nm, and YI was calculated by the following formula.

$$YI=100\times(1.2769x-1.0592z)/y$$

Bending Performance

The cover substrate was attached to a folding tester (YUASA System U-shape Folding) and folded 100,000 times at R=1 mm, then the cover substrate was first observed for fracture, and then the hard coating layer was observed with a naked eye and a microscope for cracks. Any case where the cover substrate was fractured or the hard coating layer was cracked was marked as unacceptable (X), and cases where there was no fractures or cracks were marked as acceptable (O).

The test results of the performance evaluation are recorded in Table 1.

TABLE 1

| No. | Hue conditioning material | Weight ratio in hard coating layer | Hard coating layer thickness | P1 substrate thickness | Light transmittance | Haze | YI | Pencil hardness | Bending performance |
|---|---|---|---|---|---|---|---|---|---|
| Example 1 | Coumarin1 | 0.1 | 20 | 50 | 92.5 | 0.6 | 1.72 | 9H | O |
| Example 2 | Coumarin1 | 0.27 | 20 | 50 | 92.3 | 07 | 1.08 | 9H | O |
| Example 3 | Coumarin1 | 0.5 | 20 | 50 | 92 | 0.7 | 1.6 | 9H | O |
| Example 4 | Coumarin1 | 1 | 20 | 50 | 92 | 0.7 | 1.6 | 9H | O |
| Example 5 | Coumarin7 | 0.27 | 20 | 50 | 91.9 | 0.6 | 1.18 | 9H | O |
| Example 6 | Fluorol 7GA | 0.27 | 20 | 50 | 91.8 | 0.7 | 1.21 | 9H | O |
| Comparative example 1 | — | — | 20 | 50 | 92.2 | 0.8 | 2.8 | 9H | O |
| Comparative example 2 | Coumarin1 | 0.08 | 20 | 50 | 92 | 0.7 | 1.6 | 9H | O |
| Comparative example 3 | Coumarin1 | 1.09 | 20 | 50 | 92 | 0.7 | 1.6 | 9H | O |
| Comparative example 4 | CuPc | 0.02 | 20 | 50 | 88.9 | 0.9 | 1.6 | 9H | X |
| Comparative example 5 | CuPc | 0.27 | 20 | 50 | 85.1 | 0.9 | −0.2 | 9H | X |
| Comparative example 6 | Pigment Blue 60 | 0.02 | 20 | 50 | 89.1 | 0.9 | 1.5 | 9H | X |

Figure 2:
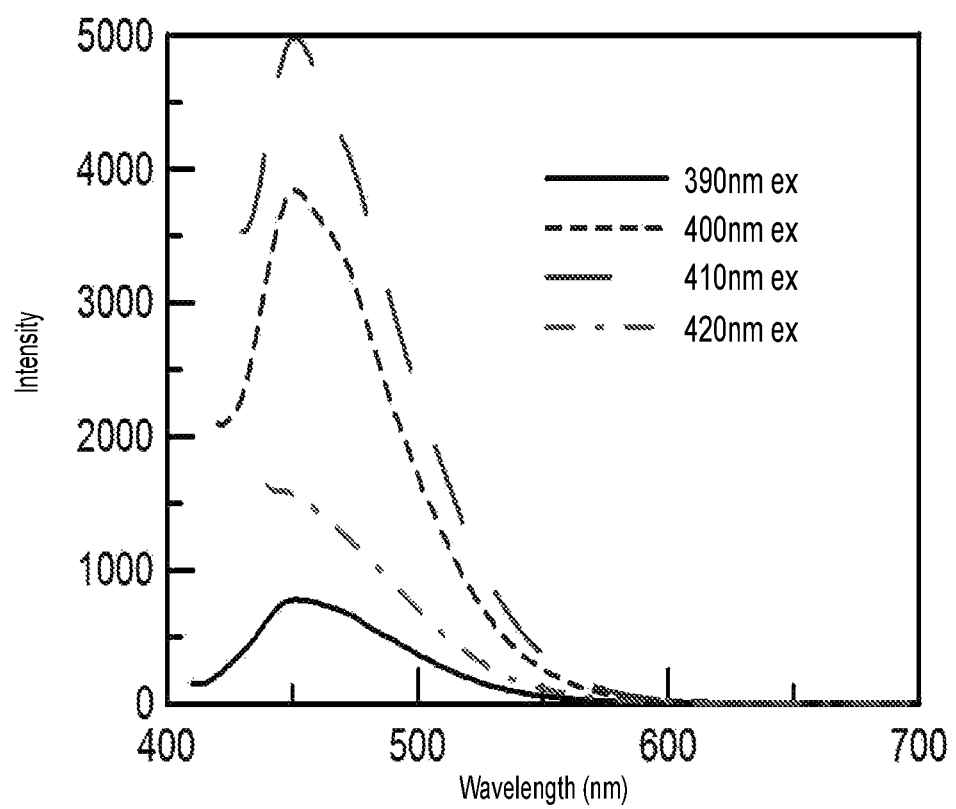
FIG. 2 is a schematic diagram of intensity and wavelength.

It may be seen from Comparative example 1 that the YI value is significantly larger (>2) without the addition of any hue conditioning material, mainly because the yellow index caused by the increase in the thickness of the transparent polyimide film is increased. The results of Examples 1 to 4 and Comparative example 2 and Comparative example 3 show that the addition of the fluorescent pigment may significantly improve the yellow index YI of the cover substrate, but when the amount of the fluorescent pigment is <0.01%, the concentration of addition is too low such that the intensity of the blue light excited by the fluorescent pigment is insufficient, and the yellow index YI cannot be effectively reduced. The results also show that the yellow index may be gradually reduced as the concentration of addition of the fluorescent pigment is increased, but when the concentration is too high, the fluorescence emission intensity is weakened due to a quantum confinement effect, and as a result the yellow index YI cannot be effectively reduced. In Comparative examples 4 to 6, a blue pigment was added, and the blue pigment was effective in balancing the color so that the yellow index was significantly lowered, and the greater the addition, the lower the yellow index, and a negative value may even be achieved. However, the light transmittance of the cover substrate is also reduced as the amount of the blue pigment added is increased, and the appearance of the cover substrate is also changed from colorless transparent to light blue, thus affecting the appearance of the product. The visible light spectrum (FIG. 1) of Example 5 and Comparative example 5 clearly shows that the addition of blue pigment results in absorption at a wavelength of 550-600 nm, which affects the transmission of visible light; and the addition of a fluorescent pigment results in absorption at a wavelength of 400-420 nm, which only affects the transmission of violet light and near-ultraviolet light, so the transmission ability in visible light is better than the addition of blue pigment. FIG. 2 shows that after the addition of the fluorescent pigment, blue fluorescence is generated at a wavelength of 400 nm and a wavelength of 410 nm, wherein the maximum emission wavelength is 450 nm, and the maximum emission intensity is excited at a wavelength of 410 nm. Moreover, the blue pigment is directly added to the hard coating layer, but since the blue pigment is not soluble in the solvent, the blue pigment may only be mixed into the hard coating layer material by suspension. Since the blue pigment does not cause a photocrosslinking reaction with the hard coating layer material, if the blue pigment particles are too large, defects are likely to be generated in the hard coating layer, so that cracks are easily produced in the folding process of the hard coating layer, thus affecting the folding of the cover substrate.

Based on the above, the flexible display cover substrate of the invention has a thinned hard coating layer, and therefore has excellent performance in flexibility, and the hard coating layer is still not cracked after being bent 100,000 times through a radius of curvature of 1 mm. At the same time, the introduction of the fluorescent pigment may adjust the yellow index of the flexible display cover substrate without affecting the visual color of the screen, thus effectively solving the shortcoming that the appearance of the display is affected in the prior art.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:
1. A flexible display cover substrate, comprising:
a transparent polyimide film; and
a device protective layer formed by a hard coating layer and disposed on at least one side of the transparent polyimide film, and the hard coating layer is composed of three or ore reactive functional group compounds, an initiator, an elastic oligomer, a nano inorganic modified particle, and a fluorescent pigment,
wherein the elastic oligomer is an oligomer of carbamate (meth)acrylic acid, and is formed by reacting hydroxy (meth)acrylate and diisocyanate.
2. The flexible display cover substrate of claim 1, wherein a yellow index YI of the flexible display cover substrate is less than 2.0.
3. The flexible display cover substrate of claim 1, wherein the fluorescent pigment is composed of a photoluminescent material and has an absorption wavelength of 360 nm to 430 nm and an emission wavelength of 430 nm to 520 nm.

4. The flexible display cover substrate of claim 1, wherein a Stokes shift of the fluorescent pigment is less than 150 nm.

5. The flexible display cover substrate of claim 1, wherein the fluorescent pigment is a Coumarin series, Fluorol 7GA (2-butyl-6-(butylamino)-1H -benz[de]isoquinoline-1,3(2H)-dione), pyridine 1 (1-ethyl-2-(4-(p -dimethylaminophenyl)-1,3-butadienyl)-pyridinium perchlorat), carbazole, a fluorescent powder, or a quantum dot.

6. The flexible display cover substrate of claim 1, wherein based on a total weight of the hard coating layer, an amount of the fluorescent pigment is 0.01 wt % to 1 wt %.

7. The flexible display cover substrate of claim 1, wherein a thickness of the flexible display cover substrate is 50 μm to 130 μm and a total light transmittance thereof is 90% or more.

8. The flexible display cover substrate of claim 1, wherein a thickness of the hard coating layer is 5 μm to 30 μm and a hardness thereof is 7H to 9H.

9. The flexible display cover substrate of claim 1, wherein a thickness of the transparent polyimide film is 25 μm to 100 μm.

10. The flexible display cover substrate of claim 1, wherein based on a total weight of the hard coating layer, amounts of the three or more reactive functional group compounds and the initiator are 10 wt % to 60 wt %.

\* \* \* \* \*